Aug. 7, 1945.   M. G. BROWN   2,381,642
HAND TRUCK AND BRAKE THEREFOR
Filed Oct. 30, 1944   2 Sheets-Sheet 1

Inventor
*Marion G. Brown.*

By *Clarence A. O'Brien
and Harvey B. Jacobson*
Attorneys

Aug. 7, 1945.  M. G. BROWN  2,381,642
HAND TRUCK AND BRAKE THEREFOR
Filed Oct. 30, 1944   2 Sheets-Sheet 2

Inventor
Marion G. Brown

By Clarence A. O'Brien
and Harvey B. Jacobson
Attorneys

Patented Aug. 7, 1945

2,381,642

UNITED STATES PATENT OFFICE 2,381,642

HAND TRUCK AND BRAKE THEREFOR

Marion G. Brown, Tacoma, Wash.

Application October 30, 1944, Serial No. 561,015

3 Claims. (Cl. 188—22)

My invention relates to improvements in hand trucks of the two-wheeled type, and particularly to brake mechanism therefor.

The primary object of my invention is to equip such trucks with simply constructed, inexpensive brake mechanism adapted for quick, easy hand operation to apply the brakes and to lock or unlock the same without necessitating removing the hands from the usual handles of the truck, and which can be installed on the usual two-wheeled hand truck without altering the basic structure of the truck.

Other and subordinate objects are also comprehended by my invention, all of which, together with the precise nature of my improvements, will be readily understood when the succeeding description and claims are read with reference to the drawings accompanying and forming part of this specification.

Figures 1, 2:
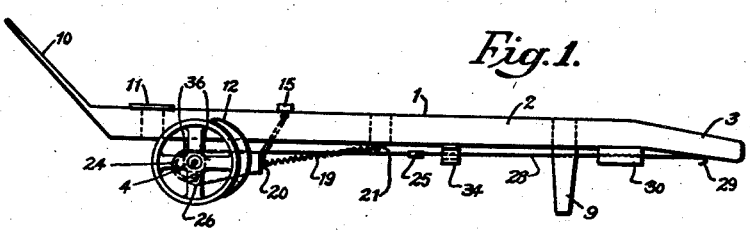
Figure 3:
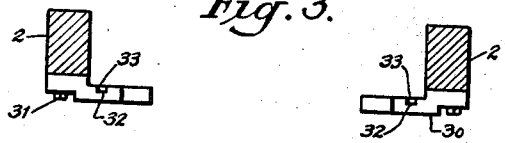
Figure 4:
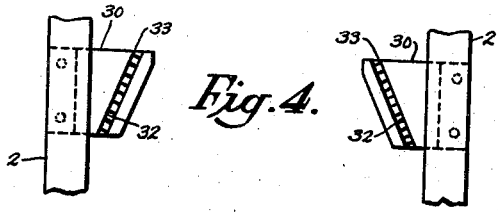
Figure 7:
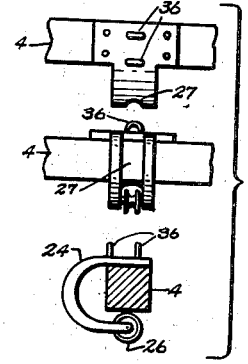
Figure 5:
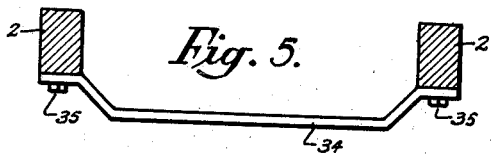
Figure 8:
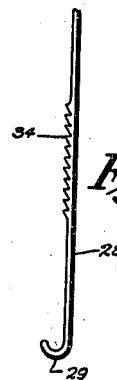
Figure 6:
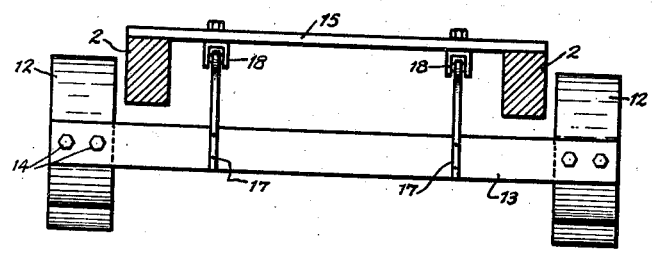

In said drawings:

Figure 1 is a view in side elevation, partly in section, illustrating my invention in a preferred embodiment thereof, Figure 2 is a view in plan, Figure 3 is a view in transverse section taken on the line 3—3 of Figure 2 and drawn to an enlarged scale, Figure 4 is a fragmentary view in plan illustrating the pair of detent brackets, Figure 5 is a view in transverse section taken on the line 5—5 of Figure 2, and drawn to an enlarged scale, Figure 6 is a similar view taken on the line 6—6 of Figure 2, Figure 7 is a composite view showing the cable guide in plan and in front and side elevations, respectively, and Figure 8 is a view in side elevation of one of the pull rods.

Referring to the drawings by numerals, my improvements have been shown therein as embodied in a well known type of hand truck in which the frame 1 embodies a pair of side bars 2 terminating in rear end handles 3 and supported adjacent the front ends thereof by a fixed axle bar 4 with a pair of ground wheels 5 on the opposite ends thereof. Cross bars 6, 7 and 8 connect the side bars 2 in the usual manner. The side bars 2 are provided with side supporting legs, as at 9, adjacent the handles 3. The numeral 10 designates the usual load pick-up yoke at the front ends of said bars 2, and the numeral 11 the usual wheel guard plates.

According to my invention, a pair of suitable brake shoes 12 are mounted in the rear of the wheels 5 upon the opposite ends of a brake beam 13, as by bolts 14. The brake beam 13 is suspended beneath the side bars 2 in transversely extending position from a cross bar 15 having its ends bolted, as at 16, on top of the side bars 2. A pair of rods 17 rigid with the brake beam 13 and upstanding therefrom between the side bars 2 are pivotally connected, at their upper ends, as at 18, to the cross bar 15, whereby said brake beam is swingably suspended for movement with the brake shoes 12 toward and from the wheels 5. The brake beam 13 is normally pulled away from the wheels 5 and the brake shoes 12 released, by means of a coil spring 19 having one end suitably connected to said beam in the center thereof, as indicated at 20, and its other end connected to the cross bar 7, as at 21.

Means are provided for applying the brake shoes 12 in opposition to the spring 19 comprising the following. A pull cable 22 is suitably connected at one end, as indicated at 23, to the brake beam 13 in the center thereof and said cable is extended forwardly and upwardly around a cable guide 24 on the axle bar 4 and then rearwardly over said guide with its other end terminating in a ring 25 and at a suitable point intermediate said beam 13 and the handles 3 for a purpose presently apparent. The cable guide 24 has the form of a U-shaped member straddling the axle bar 4 in the center thereof with one end enlarged into plate-like form and bolted, as at 25, to the top of the axle bar, the arrangement being such that said member curves forwardly and downwardly in front of said axle bar 4 with its other end extending rearwardly under the bar and being equipped with a sheave 26. As best shown in Figure 7, the described member of the cable guide 24 is grooved, as at 27, to guide the cable 22 thereover from the sheave 26 beneath which said cable is trained, as best shown in Figure 1. The described cable guard 24 provides for free sliding of the pull cable 22 over the same and obviates wear on said cable. A pair of rearwardly diverging pull rods 28 are suitably connected at the front ends thereof to the ring 25, and which terminate in hooked hand grips 29 at the rear ends thereof disposed beneath the handles 3. The pull rods 28 are supported, forwardly of the hand grip ends 29 thereof by a pair of plates 30 bolted, as at 31, to the under sides of the side bars 2 to extend inwardly of the frame 1 and which are provided with diagonal guide grooves 32 therein in which said rods 28 are adapted to slide. The guide grooves 32 are provided with bottom teeth 34 and the pull rods 28 with complemental teeth 33 adapted to interlock with the teeth 34 and lock said pull rods 28 in different positions. A cross bar 35 bolted to the side bars 2 in the rear of the ring 25 acts as a rest for the front ends of the pull rods 28.

If desired, a pair of staple-like guides 36 for the pull cable 22 may be provided on top of the cable guide 24.

As will be clear, the described brake mechanism is locked, normally, against operation by interengagement of the teeth 34 with the teeth 33 of the plates 30. To unlock the brake mechanism, it is merely necessary to lift the pull rods 28 by means of the hand grips 29. After the brake mechanism is thus unlocked, to set the brake shoes 12, it is merely necessary to exert pull on the pull rods 28 by means of the hand grips 29 and, as will be obvious, such pull may be easily exerted by the fingers of the hands grasping the handles 3. Through pull on the pull rods 28, the proper pull may be exerted on the pull cable 22 to swing the brake beam 13 toward the wheels 5 and apply the brake shoes 12 as desired. After the brake shoes 12 are applied, the brake mechanism may be locked by permitting the pull rods 28 to drop so that the teeth 34 inter-engage with the teeth 33. It is to be understood that the guide grooves 32 are of sufficient depth to guide the pull rods 28 when the teeth 34 of said rods are disengaged from the teeth 33 of the plates 30. It is also to be understood that the pull rods 28 are of sufficient flexible material to permit their operation in the manner described.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a hand truck including a pair of side bars terminating in rear end handles and an axle bar supporting said side bars adjacent the front ends thereof and provided with wheels, a brake beam in the rear of said wheels provided with end brake shoes, means swingably suspending said beam from said side bars for movement toward and from said wheels to apply and release said shoes, respectively, spring means opposing swinging of said beam toward said wheels, and means for swinging said beam toward said wheels comprising a pull cable connected at one end to said beam, a pair of pull rods connected to the other end of said cable and terminating in rear end hand grips beneath said handles, a pair of supports on said side bars for said rods over which the rods extend and from which said rods may be lifted, and coacting devices on said rods and supports for interlocking the rods with the supports by lowering the rods onto the supports.

2. In a hand truck including a pair of side bars terminating in rear end handles and an axle bar supporting said side bars adjacent the front ends thereof and provided with wheels, a brake beam in the rear of said wheels provided with end brake shoes, means swingably suspending said beam from said side bars for movement toward and from said wheels to apply and release said shoes, respectively, spring means opposing swinging of said beam toward said wheels, and means for swinging said beam toward said wheels comprising a pull cable connected at one end to said beam, a pair of pull rods connected to the other end of said cable and terminating in rear end hand grips beneath said handles, a pair of supports on said side bars for said rods over which the rods extend and from which said rods may be lifted, coacting devices on said rods and supports for interlocking the rods with the supports by lowering the rods onto the supports, and a cable guide on said axle bar around which said cable is trained and looped around said axle bar.

3. In a hand truck including a pair of side bars terminating in rear end handles and an axle bar supporting said side bars adjacent the front ends thereof and provided with wheels, a brake beam in the rear of said wheels provided with end brake shoes, means swingably suspending said beam from said side bars for movement toward and from said wheels to apply and release said shoes, respectively, spring means opposing swinging of said beam toward said wheels, and means for swinging said beam toward said wheels comprising a pull cable connected at one end to said beam, a pair of pull rods connected to the other end of said cable and terminating in rear end hand grips beneath said handles, a pair of supports on said side bars for said rods over which the rods extend and from which said rods may be lifted, and coacting devices on said rods and supports for interlocking the rods with the supports by lowering the rods onto the supports comprising toothed grooves in said supports, and teeth on said pull rods for interlocking with the teeth in said grooves.

MARION G. BROWN.